Jan. 6, 1959
E. H. MUMFORD
2,867,335
GLASSWARE TRANSFER DEVICE
Filed Nov. 1, 1954
3 Sheets-Sheet 3
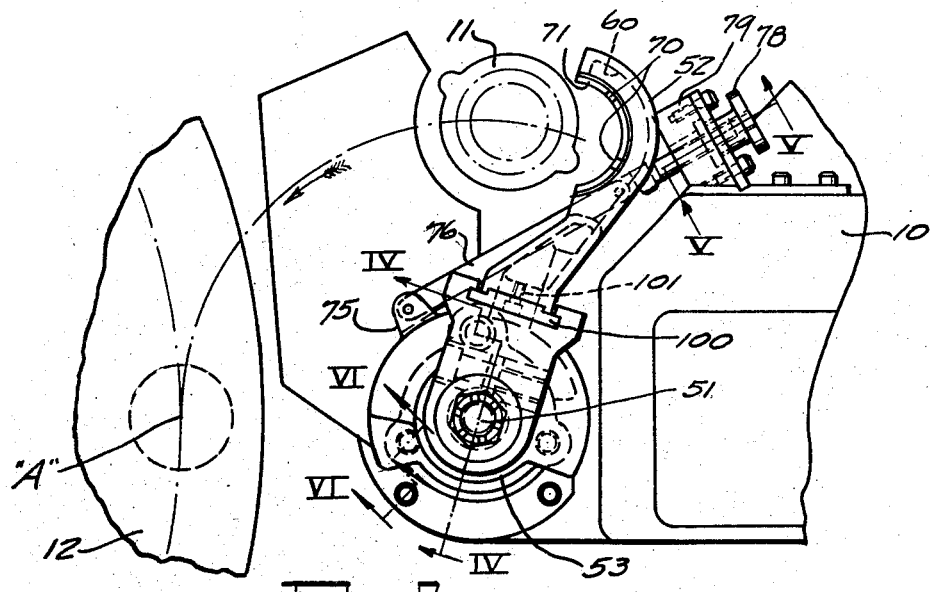
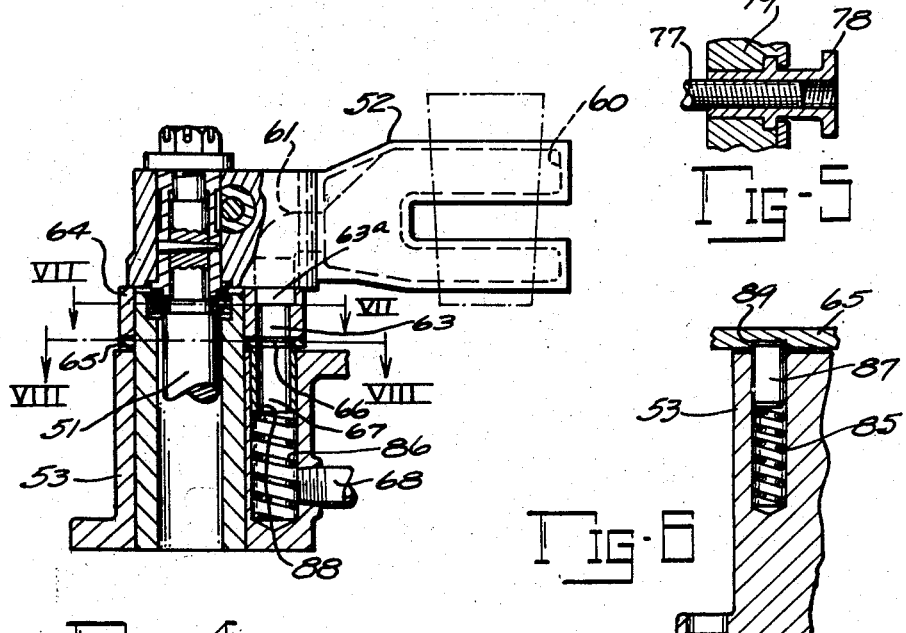
INVENTOR
EUSTACE H. MUMFORD
BY

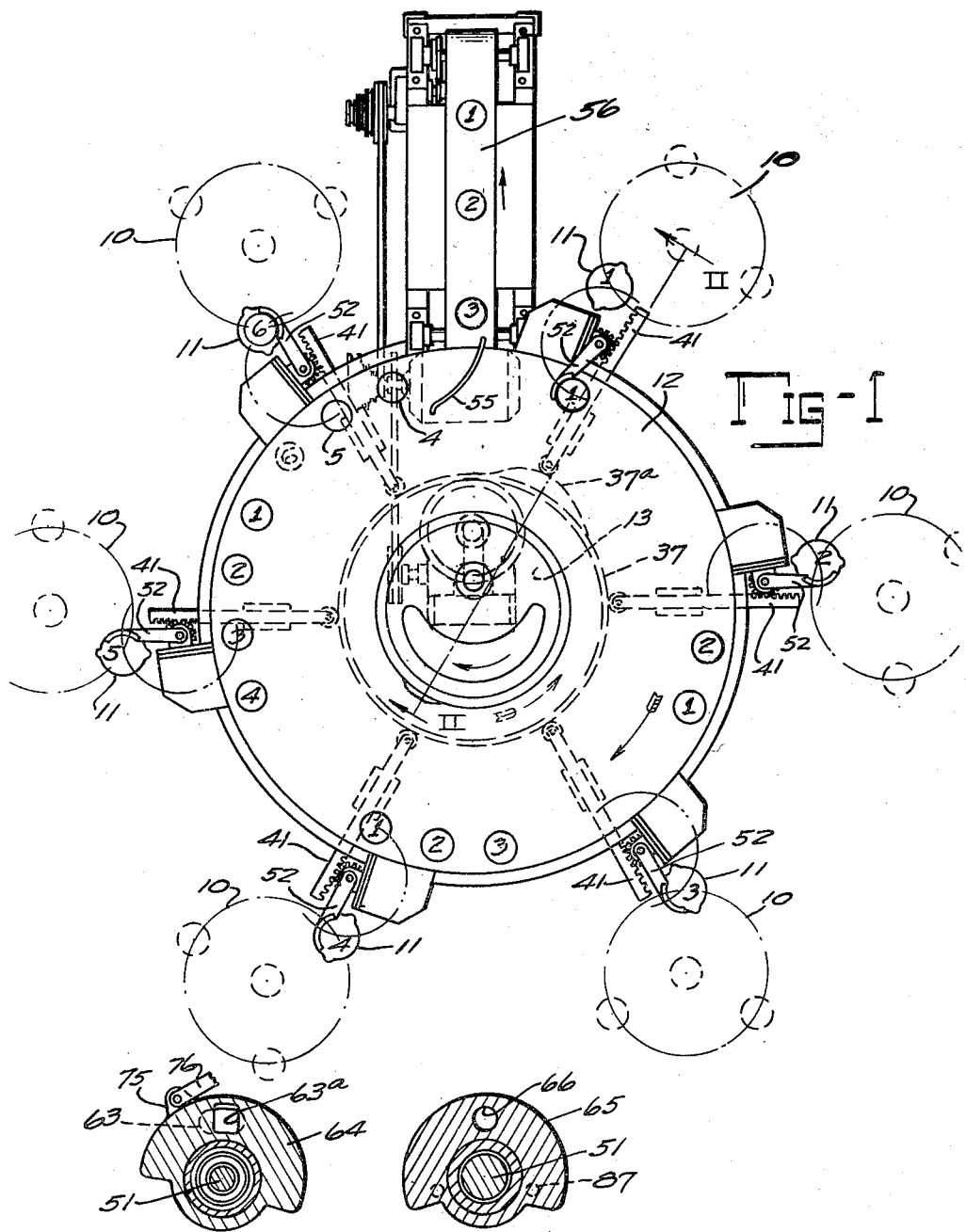

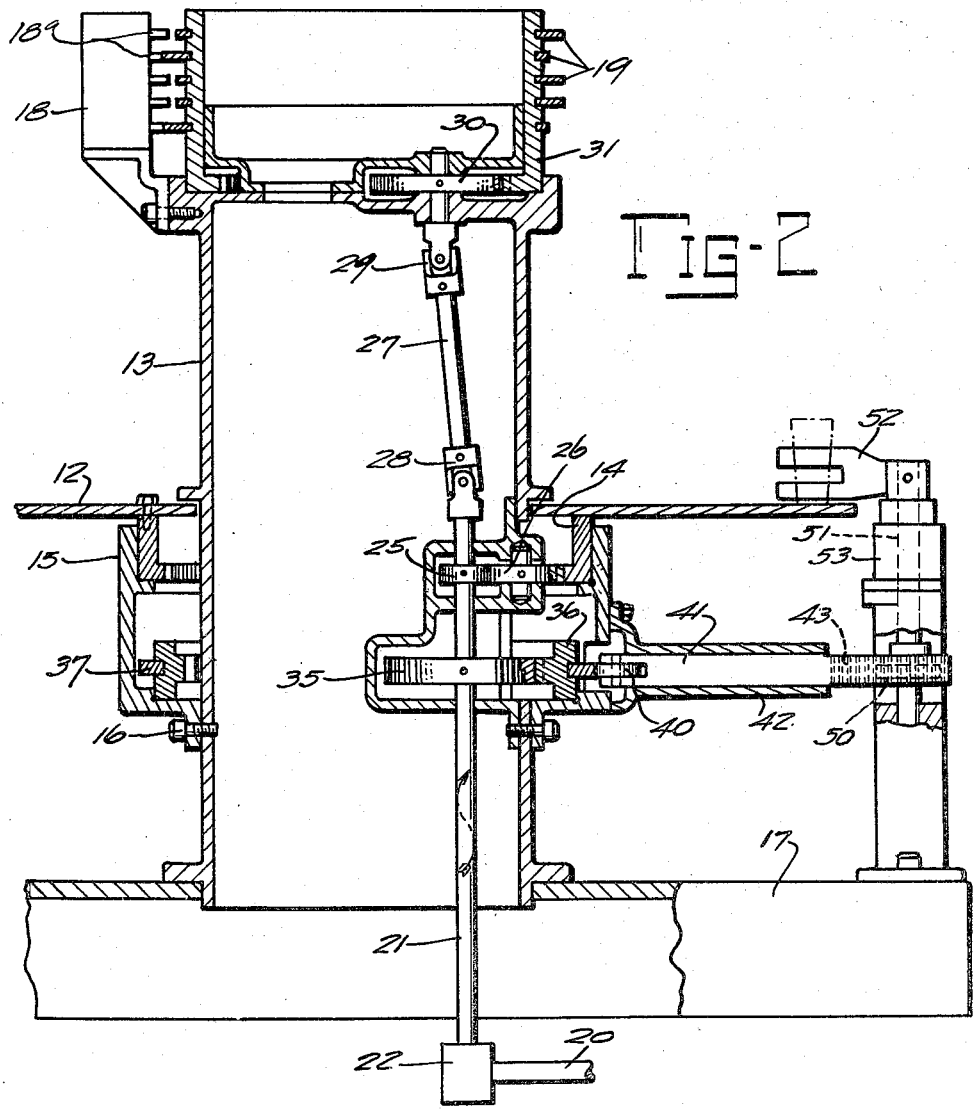

United States Patent Office 2,867,335
Patented Jan. 6, 1959

2,867,335

GLASSWARE TRANSFER DEVICE

Eustace Harold Mumford, Ottawa Lake, Mich., assignor to Owens-Illinois Glass Company, a corporation of Ohio Application November 1, 1954, Serial No. 465,868

5 Claims. (Cl. 214—1)

My invention relates to a device for transferring in seriatim newly formed glassware from an annular series of forming units to a common conveying member from whence they may be delivered to a lehr or tempering device.

An object of the present invention is to deliver formed ware to a common transfer device in such timed sequence that a vacant place always exists for the successively deposited ware.

A further object is to bodily move said ware from the forming unit to the conveyer under control of a transfer arm.

A still further object is to so transfer the ware that it will be deposited in the lehr in the same order as received from the forming stations.

Other objects will be apparent from the following disclosure.

In the drawings,

Fig. 1 is a plan view of the transfer device and illustrates the relationship between the forming stations and said device, Fig. 2 is a sectional elevation view taken at line II—II on Fig. 1 showing the transfer operating mechanisms, Fig. 3 is a plan view of an individual transfer arm showing its relation to the forming station and the transfer table, Fig. 4 is a part sectional elevation through the transfer arm hub at line IV—IV on Fig. 3, Fig. 5 is a sectional view of the vacuum adjusting rod and nut taken at line V—V on Fig. 3, Fig. 6 is a part sectional elevational of the spring tension members of the transfer arm taken at line VI—VI on Fig. 3, Fig. 7 is a sectional plan view of vacuum control member taken at line VII—VII on Fig. 3, and Fig. 8 is a sectional plan view of the vacuum transfer plate taken at line VIII—VIII on Fig. 3.

This invention specifically relates to a device for receiving and disposing of formed glass articles from an annular series of stationary article forming units. In general, the device comprises a continuously rotating horizontal table about which is circumferentially spaced and positioned the aforementioned stationary forming units and with each forming unit provided with a transfer arm adapted to transfer formed articles from the forming unit to the rotating table.

In this mechanism the table rotates clockwise while the mechanism for successively actuating each transfer arm is arranged to rotate counter clockwise.

The problem in such counter rotation is of course to insure that each time a formed article is to be positioned on the rotating table that there is an open space ready to receive such an article. This can be accomplished by having the proper relationship as between the actuating cam for the transfer arms and the speed of rotation of the ware receiving table.

In this particular disclosure a series of 6 stationary forming units are disposed about the rotary ware receiving table and as illustrated in Fig. 1, the ware transfer position of each such forming unit has been numbered clockwise from 1 to 6 inclusive.

In Fig. 1 at forming unit number 1, a fabricated article has just been delivered to the clockwise rotating table and the next succeeding unit to deliver a finished article will be from unit number 6, this because of the counter clockwise rotation of the transfer control cam. The rotary ware receiving table will move approximately 15° in its direction of rotation between the time article number 1 is delivered and the delivery of article number 6, whereas the transfer arm actuating cam will have rotated approximately 60° in the opposite direction. Thus when article number 6 is ready to be delivered, the dotted line position number 6, on the rotary table will have reached the position shown as now occupied by article number 5.

Because of this counter clockwise disposition of the ware upon the table as it rotates clockwise, the ware will be delivered to said table in a pattern as indicated in Fig. 1, wherein articles number 1, 2 and 3 are shown disposed upon a conveyer on their way to a tempering lehr with articles 4 and 5 following in their proper numerical order and with article number 6 to be disposed upon the rotary table in its proper numerical order or sequence.

By observing the further pattern of the articles positioned on the rotary table, for example, at unit number 5, it will be noted that articles 1, 2, 3, and 4 are disposed in their proper successive order so that by the time the table has rotated 30°, article number 5 will be disposed on the table in its proper numerical order or approximately 15° subsequent to article number 4.

Progressing further on the subject, it will be noted that at station 4 articles 1, 2 and 3 are already in their proper orderly disposition so that as they progress in their continuous movement a successive article will be positioned on the table in its proper relationship to article number 3. As the operation progresses further along it will be found that between units 2 and 3 article 1 and 2 are already disposed on the table and at station 1, article 1 has just been positioned on the table.

Therefore, starting at station 1 it should be apparent that as the table progresses on its clockwise rotation it passes each successive ware receiving point in such rotating relationship thereto, that as the articles are received in succession from the stations 1 to 6 inclusive, such ware will be disposed in the same numerical order and there will always be an open space at each ware receiving point on the table at the moment the ware from and specific unit is to be disposed thereon.

It will be found that as the mechanisms continue in their constant and continuous operating cycles, that is, presuming each unit continues to function, that the ware will always be disposed in the order shown on the table as in Fig. 1.

Referring to the drawings, in particular Fig. 1, there is illustrated a series of bottle forming units 10 in annular disposition about a vertical axis passing through the orifice of a glass feeding device so that each forming unit is disposed equi-distant of the source of formation of the gob of glass which is to be utilized to form a glass article. Each of these articles or bottle forming units 10, may be or the ordinary usual type, that is, a gob is received in a mold, given preliminary shape, blown to final form in a blowing mold and then disposed on a finished ware receiving pedestal 11. Each of these forming units numbered 1 to 6 inclusive is equipped with a ware receiving pedestal 11. In normal operation the gobs of glass are delivered to the forming units 10 in succession and in a counter clockwise sequence. That is, station 6 will be fed first and followed in its order by 5, 4, 3, 2 and 1.

Located centrally of these forming units is a ware receiving table 12, adapted for horizontal clockwise rotation about a vertical column 13. This horizontal table 12 is mounted upon an internal ring gear 14 which in turn is mounted in a bearing 15 attached to and supported by the column 13 as at 16. A main power driven shaft 20 driven from some motive source (not shown), drives the vertical shaft 21 through a gear box 22. Mounted on the shaft 21 is a pinion 25 adapted to drive a second pinion 26 which is meshed with the internal ring gear 14. Through this gear train the ware receiving table 12 is rotated clockwise. A shaft 27 attached to the drive shaft 21, through universal joint 28 drives a gear 30 through universal joint 29. Said gear in turn driving a cam control drum 31. Because of the interpositioned gears in the drive for the horizontal table 12, it will be found that this ware receiving table 12 will rotate clockwise, whereas the cam control drum will rotate counter clockwise.

Mounted on the upper end of column 13 will be a series of valve chests, one for each forming unit 10, as for example the chest 18 shown in Fig. 2. The various cams 19 on drum 31 are adapted to actuate the valves 18a of the chest 18 to initiate the various operations of the forming unit 10 to thereby produce a formed glass article.

Because of the fact that the control drum 31 is rotating counter clockwise the feeding of the gobs of glass to the forming units will of course also be counter clockwise and their forming sequence and the various operations such as the finishing of a formed article will happen likewise in a counter clockwise sequence. Also, mounted on the shaft 21 is a further driving gear 35 which is adapted to mesh with an internal ring gear 36 which carries on its outermost periphery a cam 37. This cam is adapted to actuate the ware transfer arms and such actuation is accomplished through contact of the cam portion 37a with a roller 40, mounted on a radially disposed rack bar 41. These rack bars are in turn mounted in holders 42 and have gear teeth 43 formed on the outer ends thereof. Each rack bar is in mesh with a pinion 50 mounted on a vertical shaft 51 upon the upper end of which is disposed a transfer arm 52. The vertical shaft 51 is mounted in a vertical bearing support 53 which in turn is mounted upon the machine base 17.

The transfer control cam 37 also moves in a counter-clockwise direction so that the actuation of each individual transfer arm 52 will be in a counter clockwise sequence or in the same order as that in which the gobs are fed to the forming units and the ware is finished in each forming unit.

The rack bars 41 are disposed at each individual forming unit station and attached to the stationary member 15 which is attached to the column 13. Between stations 1 and 6 there is disposed a scraper bar 55 adapted to slide the oncoming ware from the horizontal table 12 on to a driven conveyor 56 which may be adapted to dispose the ware directly into a lehr or to a ware feeding device in front of the lehr.

The transfer arm mechanism disposed at each forming station comprises the arm 52 which has a hollow passage 60 therein connected by a further passage 61 leading to a passage 63 formed in an adjustable plate 64. Disposed beneath the adjustable plate 64 is a second plate 65 having an opening 66 therethrough for communication with a passage 67 in the support 53 and thence to a pipe 68. This pipe 68 is connected to a source of vacuum (not shown) in order to provide vacuum through the various mentioned passages to the hollow portion 60 of the arm 52 and thence to contact openings 70 in the semi-circular portion 71 of the arm 52. This semi-circular portion 71 may have a regular or irregular shape depending upon the shape of the article being manufactured in order that there may be sufficiently intimate contact between this contact portion of the arm and the article, to permit the vacuum to become effective and attach the article momentarily to the arm.

The passage 63 through the plate 64 is formed in two sections, namely, sections 63 and 63a as indicated in Fig. 7. The portion 63 having an elongate shape to thus permit the circumferential adjustment of the plate 64 about shaft 51 for the purpose of controlling the point at which the vacuum may be discontinued during the ware positioning stroke of the transfer arm 52. In order to control the cessation of the vacuum to the arm 52 the plate 64 is provided with an extension 75 in which is mounted a link 76 attached to a threaded member 77 mounted in an adjusting nut 78. The nut 78 is in turn mounted in a bearing bracket 79 attached to a portion of a forming machine unit 10. By rotating the nut 78 the circumferential position of the slot 63 and 63a in the member 64 may be positioned with respect to passage 61 to control the point of cessation of the vacuum as the arm reaches position "A" as in Fig. 3. The position of the plate 64 may be such as to release the vacuum slightly before reaching position "A."

The sealing plate 65 disposed between the mounting 53 and the adjustable plate 64 is adapted through springs 85 and 86 working respectively against members 87 and 88 to retain this plate in sealing contact with the bottom face of the member 64. In addition, the member 87 enmeshes with depression 89 formed in the bottom face of the plate 65 and prevents this plate from having any rotary motion about the center of the shaft 51.

The arm 52 at its inner end is attached to a plate 100 by screws 101 which permits vertical adjustment of the arm 52 relative to the ware receiving pedestal 11. In addition, this arrangement permits interchange of arms so that various sizes and shapes of ware contacting surface 71 may be provided.

The general operation of this mechanism will be as follows.

Starting with the parts in the position shown in Fig. 1, the arm 52 has just transferred article number 1 from the pedestal number 1 to the rotating ware table 12. The ware table 12 being of continuous rotation continues on its way in a clockwise direction, while the cam 37 also of continuous rotation passes on its way in a counter clockwise direction. When the table 12 has rotated approximately 15° the cam portion 37a of cam 37 will have travelled 60° in its counter clockwise direction and will then move article number 6 to the table 12 at the position number 6 shown in dotted lines which by that time will have reached the position shown in Fig. 1 as occupied by article number 5. As the table continues its clockwise rotation and the cam 37a continues its counter clockwise rotation it will be found that with each 15° rotation of the table and the corresponding 60° of the counter rotation of the cam 37a will position in succession articles number 5, 4, 3, 2 and back to number 1. Thus, the articles are transferred seriatim to the table 12 in the numerical order beginning at 1 and continuing through 6.

It should be apparent that with this arrangement, whenever the cam 37a reaches a given station that there will always be a vacant space awaiting the positioning of a newly formed article thereon. By continuing the operation, it will be found that for example, bottle number 1 will only be seated on the same identical spot at every fourth revolution of the table 12.

These numerical values where given are of course specific to the particular combinations shown herein and of course will vary when such combinations are varied. For example, with the 6 forming units, the above numerical values given as examples, will prevail but as the number of forming units are changed for example, to 5 or 7 these values will change in some proportion thereto.

Modifications may be resorted to within the spirit and scope of my invention.

I claim:

1. In an apparatus for transferring formed ware from stationary ware forming units, the combination of a ware receiving table, means to continuously rotate said table in a clockwise direction, a series of ware supporting pedestals disposed in spaced apart relationship about the circumference of said table and adapted to receive formed ware from said forming units, transfer arms individual to each said pedestal, a continuously rotating cam common to all said transfer arms, said cam adapted for counter-clockwise rotation to actuate each said transfer arm in counter-clockwise sequence for transferring ware from each said pedestal in seriatim, the timing between said oppositely rotating members being such that the ware is transferred to the said receiving table in repeated numerical sequence beginning with first forming unit to the last and means to move the ware from said table in the said numerical sequence.

2. In an apparatus for transferring formed glass articles from stationary forming units, the combination of a plurality of ware forming units disposed in a closed path, each said unit being adapted to produce articles in succession, article supporting pedestals disposed at each forming unit and adapted to receive formed articles therefrom, an article receiving table, means to continuously rotate said table in a clockwise direction, transfer arms individual to each said pedestal, a continuously rotating means common to all said transfer arms adapted to actuate each said transfer arm in counter-clockwise sequence to transfer said articles from each said pedestal in seriatim to said article receiving table, the timing between said oppositely rotating members being such that the articles are transferred in a repeated successive sequence beginning with first unit to the last and a sweep-off arm arranged to remove said articles from said article receiving table in their transferred order.

3. In an apparatus for transferring formed glass articles from stationary forming units, the combination of a plurality of ware forming units disposed in a closed path, each said unit being adapted to produce articles in succession, article supporting pedestals disposed at each forming unit and adapted to receive formed articles therefrom, an article receiving table disposed within the said closed path of said forming units, means to continuously rotate said table in a clockwise direction, transfer arms disposed between said table and said pedestals and individual to each said pedestal, a continuously rotating cam common to all said transfer arms adapted to actuate each said transfer arm in counter-clockwise sequence to transfer said articles from each said pedestal in seriatim, the timing between said oppositely rotating members being such that the articles are transferred from each said pedestal and positioned on said table in the order of their formation by said forming units and means common to said articles arranged to discharge them from said receiving table in the order of their formation.

4. In an apparatus for transferring formed glass articles from stationary forming units, the combination of a plurality of article forming units disposed in an annular closed path, a plurality of ware supporting pedestals disposed in a path parallel to that of said forming units and adapted to receive formed ware therefrom, a circular ware receiving table disposed within a circle formed by said pedestals, means to continuously rotate said table in a clockwise direction, transfer arms individual to and between each said pedestal and said table, a continuously rotating cam common to all said transfer arms and adapted to actuate each said transfer arm in counter-clockwise sequence to transfer said ware from each pedestal in seriatim, the timing between said oppositely rotating members being such that the ware is transferred to and disposed upon said receiving table in a repeated sequence beginning with first formed article to the last and a ware removing device arranged to move said ware from said receiving table in the order received thereby.

5. In an apparatus for transferring formed glass articles from stationary forming units, the combination of a plurality of article forming units disposed in an annular closed path, ware supporting pedestals disposed at each forming unit, a ware receiving table common to all said article forming units, means to continuously rotate said table in a clockwise direction, transfer arms individual to and between each said pedestal and said table, means common to all said transfer arms and adapted to actuate each said transfer arm in counter-clockwise sequence to transfer said ware from each said pedestal to said table, the timing between said rotating table and said transfer arms being such that the ware is disposed upon said table in a repeated numerical sequence beginning with first formed article to the last and a ware removing device arranged to discharge said ware from said table in the repeated numerical sequence.

References Cited in the file of this patent

UNITED STATES PATENTS

| | | |
|---|---|---|
| 1,712,907 | Stenhouse | May 14, 1929 |
| 2,072,502 | Haub | Mar. 2, 1937 |
| 2,224,975 | McNamara | Dec. 17, 1940 |